(12) United States Patent
Xuan

(10) Patent No.: US 11,005,797 B2
(45) Date of Patent: May 11, 2021

(54) METHOD, SYSTEM AND SERVER FOR REMOVING ALERTS

(71) Applicant: TENCENT TECHNOLOGY (SHENZHEN) COMPANY LIMITED, Guangdong (CN)

(72) Inventor: Liyong Xuan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 108 days.

(21) Appl. No.: 15/869,629

(22) Filed: Jan. 12, 2018

(65) Prior Publication Data

US 2018/0139160 A1    May 17, 2018

Related U.S. Application Data

(63) Continuation of application No. PCT/CN2016/085520, filed on Jun. 13, 2016.

(30) Foreign Application Priority Data

Jul. 24, 2015 (CN) .......................... 201510443650.8

(51) Int. Cl.
*H04L 12/58* (2006.01)
*G06Q 50/00* (2012.01)

(52) U.S. Cl.
CPC ............. *H04L 51/12* (2013.01); *G06Q 50/01* (2013.01); *H04L 51/24* (2013.01); *H04L 51/32* (2013.01)

(58) Field of Classification Search
CPC .................................................. G06Q 50/01
See application file for complete search history.

(56) References Cited

U.S. PATENT DOCUMENTS 8,204,937 B2 * 6/2012 Blagsvedt .............. G06Q 10/10
709/204
8,924,493 B1 * 12/2014 Yeskel .................... G06F 9/542
709/206

(Continued)

FOREIGN PATENT DOCUMENTS

CN          102404127 A     4/2012
CN          103929355 A     7/2014
(Continued)

OTHER PUBLICATIONS

International Preliminary Report on Patentability for International Application No. PCT/CN2016/085520 dated Jan. 30, 2018.
(Continued)

*Primary Examiner* — Chris Parry
*Assistant Examiner* — Abderrahmen Chouat
(74) *Attorney, Agent, or Firm* — Anova Law Group, PLLC

(57) ABSTRACT

Embodiments of the present disclosure provide a method, a system and a server for removing alerts. An example method includes monitoring an alert removing instruction triggered by a current user for alerts in a social application client. An alert removing request of the current user to a server is initiated according to the alert removing instruction. Alerts triggered and returned by the server are received according to the alert removing request of the current user, with the alerts returned by the server being obtained by removing a group of alerts designated to be removed from on-going alerts in the social application client. The alerts in the social application client are updated as the alerts returned by the server.

12 Claims, 18 Drawing Sheets

(56) References Cited

U.S. PATENT DOCUMENTS

| | | | |
|---|---|---|---|
| 2002/0054117 A1* | 5/2002 | van Dantzich | G06F 3/0482 715/766 |
| 2008/0307061 A1 | 12/2008 | Jacovi et al. | |
| 2009/0177617 A1 | 7/2009 | Lee | |
| 2012/0149342 A1 | 6/2012 | Cohen et al. | |
| 2013/0054706 A1 | 2/2013 | Graham et al. | |
| 2013/0325948 A1* | 12/2013 | Chen | G06Q 50/01 709/204 |
| 2014/0164541 A1 | 6/2014 | Marceillno | |
| 2014/0253319 A1 | 9/2014 | Chang | |
| 2016/0359782 A1* | 12/2016 | Son | H04L 51/12 |

FOREIGN PATENT DOCUMENTS

| | | |
|---|---|---|
| CN | 104363161 A | 2/2015 |
| CN | 104967550 A | 10/2015 |
| JP | 2008-165418 A | 7/2008 |
| JP | 2014-501979 A | 1/2014 |
| JP | 2014-529152 A | 10/2014 |
| KR | 10-2013-0135283 | 12/2013 |
| KR | 10-2014-0030341 | 3/2014 |
| KR | 10-2014-0063743 | 5/2014 |
| WO | WO2012/078920 | 6/2012 |
| WO | WO2013/048710 | 4/2013 |

OTHER PUBLICATIONS

International Search Report with Translation for International Application No. PCT/CN2016/085520 dated Sep. 1, 2016.
Office Action with Translation Issued for Japanese Patent Application No. 2017-565983 dated Oct. 30, 2018.
Office action dated Jul. 20, 2018 in Korean Patent Application No. 10-2017-7036566 and English translation thereof.

* cited by examiner level setting module 1010 cleaning operation module 1030

Fig. 14

METHOD, SYSTEM AND SERVER FOR REMOVING ALERTS

CROSS-REFERENCE TO RELATED APPLICATIONS

This application claims priority to, and is a continuation of, International Application No. PCT/CN2016/085520, filed on Jun. 13, 2016, which further claims the benefit and priority of Chinese Application No. 201510443650.8, filed on Jul. 24, 2015, titled "Method, system and device for removing alerts in a social application client". The entire disclosures of each of the above applications are incorporated herein by reference in their entireties for all purposes.

FIELD

The present disclosure relates to a computer application technology field, and more particularly to a method, system and a server for removing an alert.

BACKGROUND

With development of the virtual social network, various kinds of social applications are developed to implement communication and other communication-related functions. The social application runs in various kinds of terminal devices in a form a client, e.g., a social application client, communicates with the server via the Internet and communicates with other social application clients via the Internet between the client and the server.

The social application client may implement a communication function via various kinds of messages. When the social application client receives a message, the social application client may alert the user of the new message, for instance, the social application client may alert the user by displaying a red dot and number on a message corresponding to each contact in a session list. Therefore, the user may visually know the receipt of new messages and the number of the new messages using the alert.

SUMMARY

Based on this, it may be necessary to provide a method for simplifying operations and avoiding loss of alerts corresponding to concerned new messages.

Further, it may be necessary to provide a system and a server for simplifying operations and avoiding loss of alerts corresponding to concerned new messages.

In order to solve the above method, following technical scheme may be adopted.

A method for removing alerts, applied to a server, which comprises: a storage, one or more processors, wherein the method includes:

receiving an alert removing request initiated by a user, who has logged into a social application client;

finding a group of alerts, which are designated to be removed, from alerts in the social application client according to the alert removing request;

removing the group of alerts, which are designated to be removed, from the alerts in the social application client; and returning alerts obtained after removing the group of alerts, which are designated to be removed, to the social application client.

A server includes:
a storage;
one or more processors;
wherein the storage stores instructions, which are executed by the one or multiple processors, the instructions are executed to perform following operations:

receiving an alert removing request initiated by a user, who has logged into a social application client;

finding a group of alerts, which are designated to be removed, from alerts in the social application client according to the alert removing request;

removing the group of alerts, which are designated to be removed, from the alerts in the social application client; and returning alerts obtained after removing the group of alerts, which are designated to be removed, to the social application client.

A method for removing alerts, applied to a social application client, which comprises: a storage, one or more processors, wherein the method includes:

displaying alerts for messages on a session interface;

monitoring an alert removing instruction triggered by a user for the alerts in the social application client;

initiating an alert removing request of the user to a server according to the alert removing instruction;

receiving alerts triggered and returned by the server according to the alert removing request of the user, wherein the alerts returned by the server are obtained by removing a group of alerts, which are designated to be removed, from alerts for the messages on the session interface in the social application client;

updating the alerts for the messages in the social application client as the alerts returned by the server.

BRIEF DESCRIPTION OF THE DRAWINGS

FIG. 14 is a diagram illustrating function modules for removing an alert in a social application client according to various embodiments of the present disclosure;

DETAILED DESCRIPTION

Figure 1:
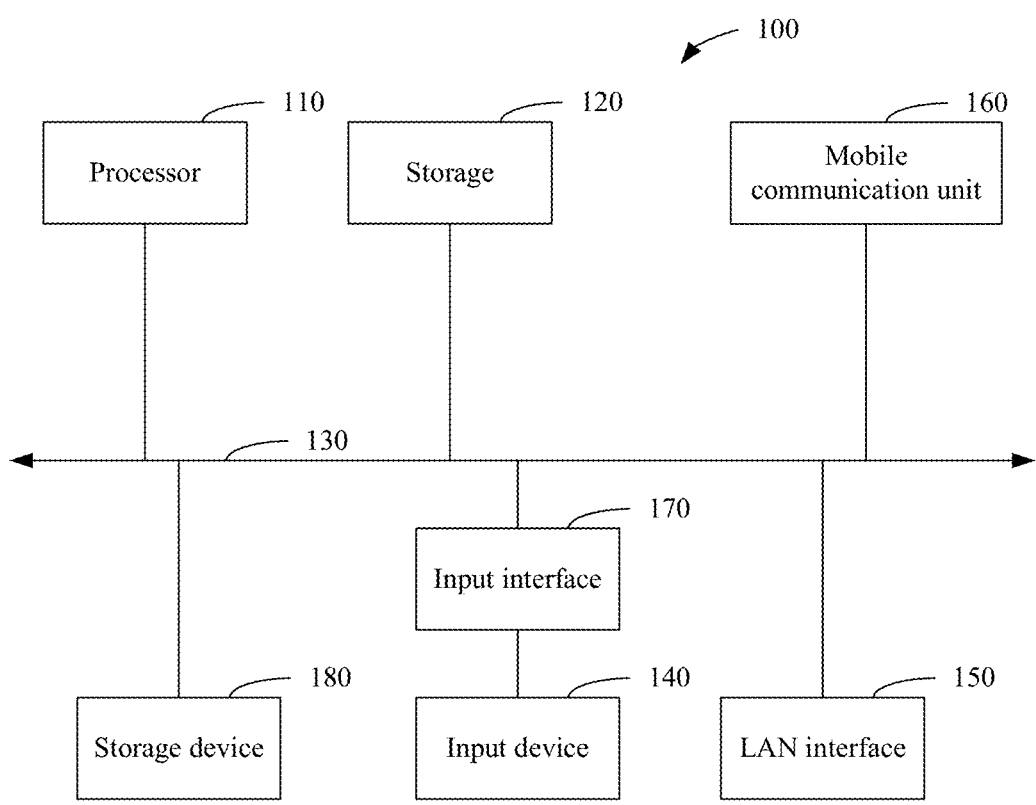
FIG. 1 is a diagram illustrating structure of a terminal device according to various embodiments of the present disclosure.

Embodiments embodying features and merits of the present disclosure may be described in detail in following description. Embodiments of the present disclosure may be varied in many ways without departing from the scope of the present disclosure. The description and figures are used to describe the present disclosure and are not used to limit the present disclosure.

In view of the above, the development of a social application may provide more plentiful and more convenient channels and functions for interactions in a virtual social networking. Messages may be transmitted in the virtual social network anytime and anywhere with the social application client running on the terminal device, e.g., a portable device, such as a smartphone. There are no more limitations on the transmission of the messages in the virtual social network.

Although the alerts in the social application client may visually and clearly display the situation of the receipt of the messages, in some scenarios, the displaying of the alerts may make some troubles, for instance, as for a social application client with a large number of contacts and groups, multiple messages may be received from multiple contacts or multiple groups in a same time period, therefore, alerts may be displayed on icons of the contacts and groups performing the session using the social application client in this time period. Then, the user may need to click a message corresponding to each contact in a session list one by one to remove the alerts corresponding to the contact. Multiple clicking operations may be needed to be performed on the messages corresponding to the multiple contacts to remove the alerts and the operation is too complicated.

This situation may result in development of a one-key-to-remove function to remove the alerts in the social application client. Although this function may solve the above problem that the operation for removing the alerts is complicated, new problems may arise. That is, alerts corresponding to messages concerned by the user may also be removed by the one-key-to-remove function, so the user cannot obtain the alerts of the new messages concerned by the user in the social application client.

Therefore, the removing of the alert performed by the social application client cannot solve the problem of complicated operation and loss of the alerts corresponding to the messages concerned by the use and may result in that the concerned new message cannot be quickly found. As for the alerts performed for the messages transmitted in the virtual social network, how to quickly recognize effective alerts from a large number of alerts, remove unimportant alerts may have become technical difficulties that need to be urgently solved in the social application client.

Based on this, a method for removing alerts in the social application client may be provided. This method may run in a computer system using computer programs.

In other words, the method for removing alerts in the social application client may be implemented with computer programs. A system formed by the computer programs for removing alerts in the social application client may be stored in an electronic device, so that the system may run in the electronic device to remove the alerts in the social application client.

The electronic devices may include terminal devices, on which the social application client may run, and a server, with which the social application clients may communicate with each other.

FIG. 1 is a diagram illustrating structure of a terminal device according to various embodiments of the present disclosure. The terminal device 100 may be an example of the present disclosure and may not be used to limit the scope of the present disclosure. The terminal device 100 cannot be interpreted as the combination, which may rely on or have the one or multiple components of the exemplary terminal device 100.

As shown in FIG. 1, the terminal device 100 may include: a processor 110, a storage 120, and system bus 130. Each kind of component including the storage 120 and processor 110 may connect to the system bus 130. The processor 110 may be the hardware that may execute computer instructions using basic algorithm and logic operation in the computer system. The storage 120 is a physical device that may temporarily or permanently store computer programs or data.

The storage 120 may store various kinds of information relating to the current user using the social application client, such as chat records, number of items of contacts and instructions corresponding to the removing of the alerts or other data. The processor 110 may execute the instructions in the storage 120 to monitor input various kinds of operations to trigger the social application client.

The terminal device 110 may include various kinds of input interfaces 170 and an input device 140, to implement input of various kinds of operations in the social application client. The input device 140 may be a touch screen, key, keyboard and mouse, etc.

The terminal device 100 may further include: a storage device 180, which may be selected from multiple kinds of computer readable mediums. The computer readable medium may be any kind of available medium that may be accessed and may be classified into two types, e.g., a removable medium and a fixed medium. For instance, the computer readable medium may include but may not be limited to a flash memory (mini-Secure Digital (SD) memory card), Compact Disc Read-Only Memory (CD-ROM), Digital Video Disk (DVD), or other optical disc storage, cassette, tape, magnetic disk storage, or any other medium that may store needed information and may be accessed.

The above terminal device 100 may logically connect to the server through the network. The terminal device 100 may further include a Local Area Network (LAN) interface 150, and/or mobile communication unit 160, and connect to the server via the LAN interface 150 or the mobile communication unit 160.

In view of the above detailed description, the terminal device 100, which may be applicable to the present disclosure, may execute designated operations for removing the alerts in the social application client by levels. That is, the processor 110 may run the instructions in the storage 120 to execute the designated operations, and interact with the server via the LAN interface 150 or mobile communication unit 160 to obtain reminding alerts obtained after the alert removing operation is performed for the alerts in the social application client.

Further, the present disclosure may be implemented via the circuit or the circuit and instructions. Therefore, the present disclosure may not be limited to any specific circuit, or software or combination thereof.

Figure 2:
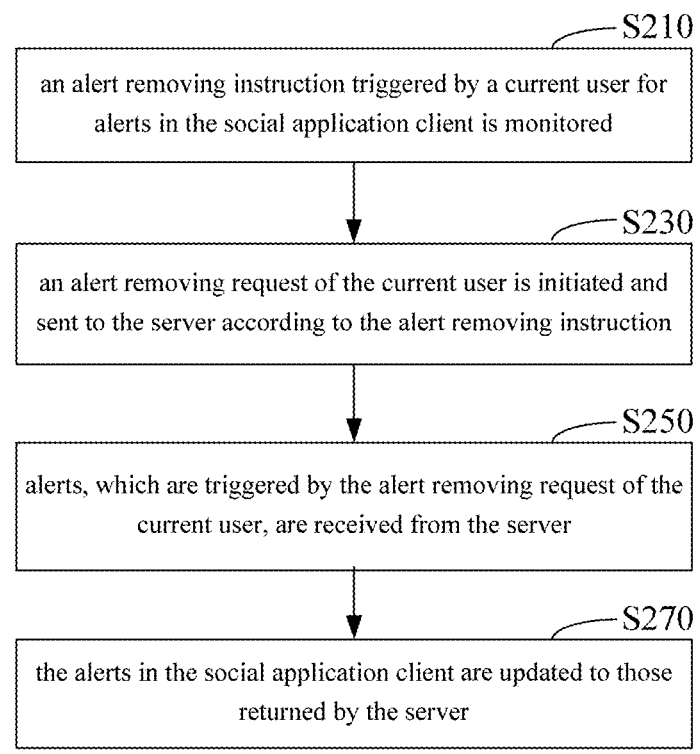
FIG. 2 is a flow chart illustrating a method for removing an alert in a social application client according to various embodiments of the present disclosure.

In an embodiment, the method for removing an alert in the social application client may be shown in FIG. 2 and include following blocks.

At block S210, an alert removing instruction triggered by a current user for alerts in the social application client may be monitored.

The current user may be a user that has logged in the social application client. It should be noted that the users in the embodiments of the present disclosure may be objects performing interactions such as message transmission in a virtual social network, at which the social application client may be located and the users may be some identity information, which may be used to identify entities triggering various functions in the virtual social network. The social application clients in the virtual social network may be distinguished via the users. In other words, the current user may be identity information used to log in the social application client, and the identity information may be an account. Various operations triggered by the current user in the social application client may be various operations triggered in the social application client in which a login operation has been perform on the social application client using the identify information.

Further, in the running social application client, a session list may be displayed on an interface of the social application client. The session list may include several contact items and/or group items. That is, the session list may include items corresponding to the contacts or groups, which may carry out a session with the current user. The items may include the corresponding contacts, or groups or a latest message. Therefore, the alerts may be displayed on a corresponding contact item or group item in the session list.

The session list displayed on the interface of the social application client may be monitored to obtain a triggered alert removing instruction. The alert removing instruction may be generated by any preset operation. For instance, the preset operation may be an operation of sliding across a certain area of the screen, a long press operation on an area of the screen, which may not be listed here and may be flexibly configured according to manipulation habits.

At block S230, an alert removing request of the current user may be initiated and sent to the server according to the alert removing instruction.

The social application client may initiate the alert removing request and send the alert removing request to the server according to the monitored alert removing instruction, to inform the server to remove the on-going alerts, e.g. the alerts, which are being displayed in the social application client.

At block S250, alerts, which may be triggered by the alert removing request of the current user, may be received from the server.

The alerts returned by the server may be obtained by removing a group of alerts, which may be designated to be removed, from the alerts, which are being displayed in the social application client.

After the server receives the alert removing request initiated by any social application client, the alert removing request may trigger the server to remove the alert in the social application client, in which the current user has logged.

In the above removing processing, the group of alerts, which may be designated to be removed, may include one or multiple alerts, which may be designated to be removed. The group of alerts, which may be designated to be removed, may be a group of designated alerts, such as alerts corresponding to junk messages, or alerts corresponding to messages from strangers.

With this mode, the alerts in the social application client may be directly divided into several groups of alerts. A monitored alert removing instruction may include information indicating a group of to-be-removed alerts, e.g. a group of alerts, which may be designated to be removed. Therefore, the alerts in the social application client may be according processed, such as the group of to-be-removed alerts may be removed.

When a next alert removing instruction, which may correspond to another group of alerts, is monitored, the another group of alerts in the social application client may be processed according to the processing of the alerts in this group, and so on, to remove the several groups of alerts in the social application client in turn.

Further, a grading rule may be preset for the removing of the alerts. The alerts of a level may be taken as those, which may be designated to be removed by the currently-monitored alert removing instruction, according to the preset grading rule.

In this scenario, when a next alert instruction is monitored, alerts of the next level may be taken as a group of alerts, which may be designated to be removed, according to the preset grading rule.

That is, as for the alerts in the social application client, the to-be-removed alerts may be directly designated or determined according to the preset grading rule.

Specifically, according to the preset grading rule, each alert may correspond to a message type and each message type may correspond to a corresponding alert level. Therefore, the server may obtain an alert level corresponding to an alert according to the message type and an ascending order of the alert levels may be the order that the alerts may be removed.

In other words, the sequence for removing the alerts may be determined according the types corresponding to the alerts, and whether the current alert would be removed may be determined.

The alerts of the minimum level may be those that may be removed first.

In a process that the server makes a response to the alert removing request, each time a user logging in to the social application client triggers the generation of an alert removing instruction, the alerts of the minimum level in the multiple alerts received by the social application client may be removed. When the alert removing instruction is generated again, the alerts of the minimum level in the reminding alerts, which may be obtained after a previous alert removing operation is performed, may be removed.

With the generation of the alert removing instructions, the alerts may be removed according to an ascending order of the levels of the alerts.

The alert level may be related to importance of the message type. For instance, a message corresponding to a message type may be sent from a session object, which may have interacted with the current user in the recently three days, such as a contact or a group, it may show that the message may attract much attention. The alert of the message may be important and may correspond to a high alert level. When a message corresponding to message type is sent from a stranger, it may show that the message may be highly likely to be a spam. Therefore, the alert level of the alert may be low.

With the above process, the alerts in the social application client may be removed according to levels of the alerts. Therefore, an important message may be effectively prevented from be drowned out by a large amount of alerts and the missing of checking of the messages may be effectively avoided in the screening process of the multiple alerts. Therefore, the effectiveness of the alerts in the social application client may be improved and high efficiency of the message transmission may be ensured.

At block S270, the alerts in the social application client may be updated to those returned by the server.

After the social application client receives the alerts from the server, the social application client may update a session list to update the alerts in the session list to the alerts received from the server. Concerned messages may be rapidly obtained with the updated alerts.

With the above process, the current user may trigger the generation of the alert removing instruction to remove the alerts more than once, to make the alerts be close to those concerned by the user and shield ineffective alerts in the alerts, such as alerts of spams.

Figure 3:
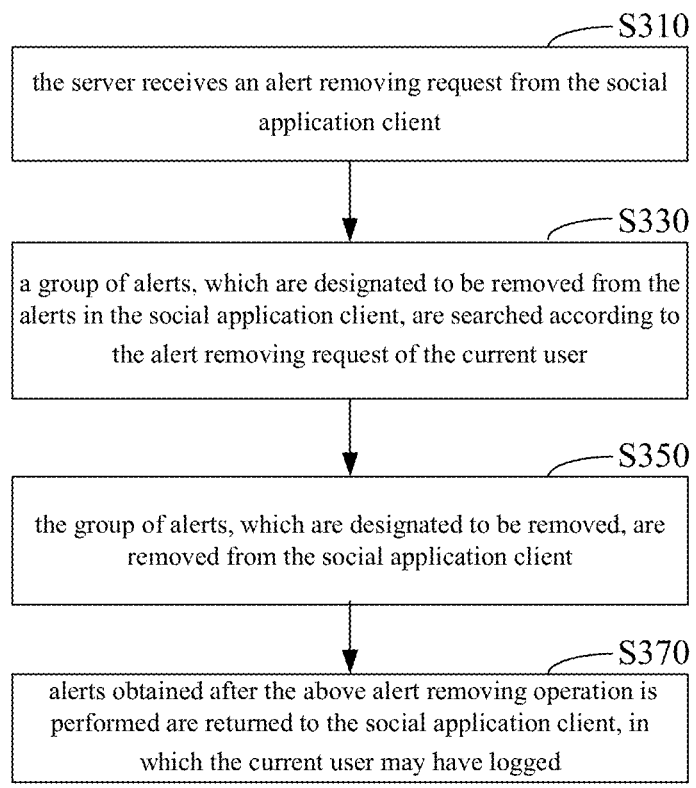
FIG. 3 is a flow chart illustrating a method for removing an alert in a social application client according to various embodiments of the present disclosure.

In another example, as shown in FIG. 3, a method for removing alerts in the social application client at the server may include following blocks.

At block S310, the server may receive an alert removing request from the social application client.

The server may interact with a large amount of social application clients. After receiving the alert removing request from any social application client, an alert removing instruction in the social application client may be triggered according to the alert message request.

At block S330, a group of alerts, which may be designated to be removed from the alerts in the social application client, may be searched according to the alert removing request of the current user.

The server may search a group or multiple groups of alerts in pre-designated messages to determine a group of alerts, which may be designated to be removed from the alerts in the social application client.

Further, the server may store the grading rule corresponding to the current user, and find alerts of the minimum level from the alerts in the social application client according to the grading rule.

Figure 4:
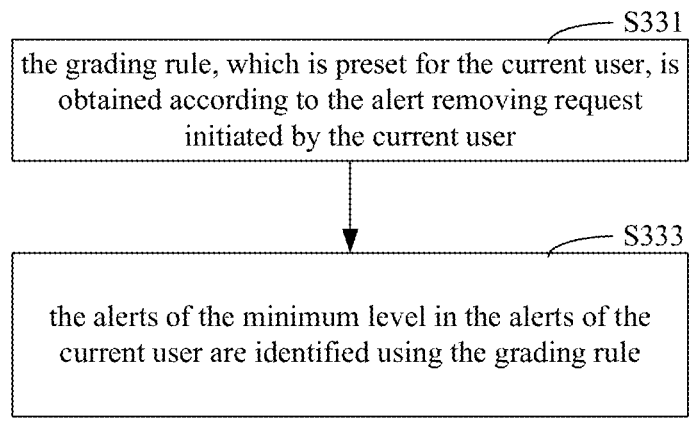
FIG. 4 is a flow chart illustrating a method for finding a group of alerts, which are designated to be removed, from alerts in the social application client according to an alert removing request from a current user in FIG. 3.

Specifically, when a group of alerts in the designated alerts are the alerts of the minimum level, as shown in FIG. 4, the block S330 may include following blocks.

At block S331, the grading rule, which may be preset for the current user, may be obtained according to the alert removing request initiated by the current user.

A grading rule may be preset for each user and may be stored in the server. The grading rule may include: several priority groups. Each priority group may include description of a message type, and messages matching the description may belong to this message type. The alert level corresponding to the message may be this priority.

At block S333, the alerts of the minimum level in the alerts of the current user may be identified using the grading rule.

The server has the ability to recognize the alert level of the alert using the grading rule, and to determine the alerts of the minimum level alert in the current user's alerts.

Figure 5:
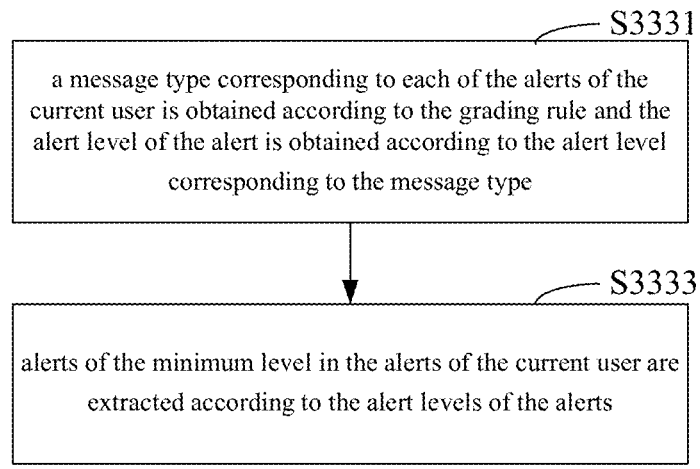
FIG. 5 is a flow chart illustrating a method for identifying alerts of the lowest level from all alerts of the current user according to a grading rule in FIG. 4.

Specifically, as shown in FIG. 5, the process includes:

At block S3331, a message type corresponding to each alert in the alerts of the current user may be obtained according to the grading rule and the alert level of the alert may be obtained according to the alert level corresponding to the message type.

That is, after obtaining the grading rule preset for the current user, each priority group in this grading rule may be read. The message types corresponding to the alerts may be obtained according to the description of the priority groups. That is, the priority group, to which each alert may belong, may be identified first and then the alert level of the each alert may be further obtained.

At block S3333, alerts of the minimum level in the alerts of the current user may be extracted according to the alert levels of the alerts.

After determining the alert level of each alert of the current user, the minimum alert level in the alerts of the current user may be determined and a group of alerts corresponding to the minimum alert level may be further extracted.

At block S350, the alerts in the social application client may be removed according to the minimum alert level.

At block S370, reminding alerts obtained after the above alert removing operation is performed may be returned to the social application client, in which the current user may have logged.

After the above alert removing operation is finished and the reminding alerts in the social application client are obtained, the reminding alerts may be sent to the current user via the link between the social application client and the server according to a user Identity (ID).

Figure 6:
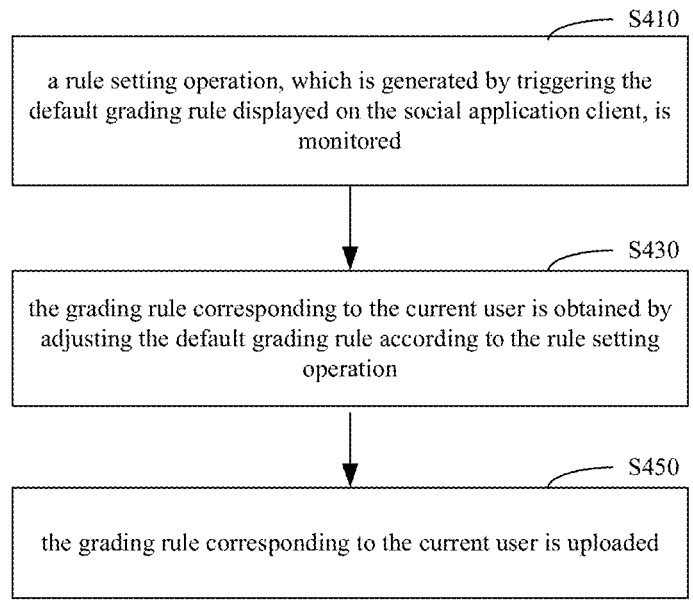
FIG. 6 is a flow chart illustrating a method for removing an alert in a social application client according to various embodiments of the present disclosure.

In another embodiment, as shown in FIG. 6, the above method may further include following blocks.

At block S410, a rule setting operation, which may be generated by triggering the default grading rule displayed on the social application client, may be monitored.

On the interface of the social application client, the default grading rule of the current user may be displayed as needed.

At block S430, the grading rule corresponding to the current user may be obtained by adjusting the default grading rule according to the rule setting operation.

The displayed default grading rule may include description corresponding to several priority groups. The current user may initiatively set a rule in the displayed default grading rule to adjust the default grading rule.

At block S450, the grading rule corresponding to the current user may be uploaded.

Figure 7:
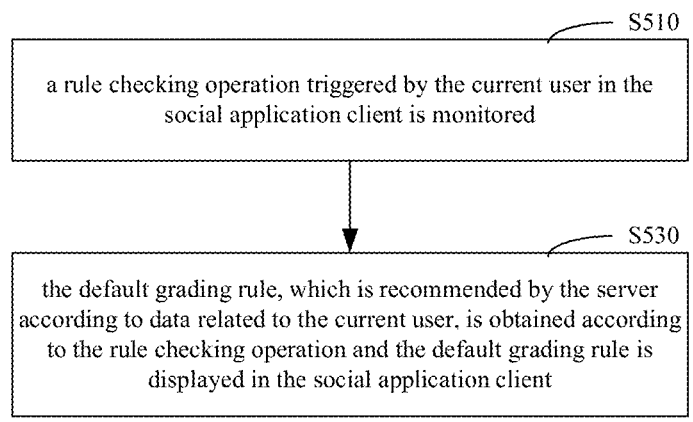
FIG. 7 is a flow chart illustrating a method for removing an alert in a social application client according to various embodiments of the present disclosure.

Further, in this embodiment, as shown in FIG. 7, before the block S410, the above method may further include following blocks.

At block S510, a rule checking operation triggered by the current user in the social application client may be monitored.

Before grading rule is set for the current user, the server may recommend the user with the default grading rule, so that the alerts in the social application client may be removed level by levels.

At block S530, the default grading rule, which may be recommended by the server according to data related to the current user, may be obtained according to the rule checking operation and the default grading rule may be displayed in the social application client.

After obtaining the rule checking operation triggered by the current user in the social application client, the default grading rule may be calculated according to the data related to the current user, so that the user may obtain the default grading rule with the rule checking operation and adjust the default grading rule according to the actual condition.

The data related to the current user may include: big data related to the current user, and system information of the user in the social application client. For instance, the big data of the current user may include that generated in the social activity performed by the user in the virtual social network. Varity behaviors of the user, such as interests, friend intimacy and user's attention, may be analyzed and obtained using the big data related to the current user. The system information of the current user in the social application client may include: contacts or groups in an address book. The system information of the user in the social application client may be used to determine the contacts in the address book and the strangers.

The server make a suggestion for the default grading rule of the current user according to the big data related to the user, which may provide a good basis for the grading rule, which may be initiatively by the user in a subsequent operation. With the method for removing the alerts in the social application client in embodiments of the present disclosure, as for the actual operation, since the one-key-to-remove function does not conflict with the level-based removing function implemented by the embodiments of the present disclosure, the alerts may be removed using one-key-to-remove function or removed by levels according to requirements of actual scenario. The user may only need to trigger different operations. This solution may make the social application client have more powerful performances, may be compatible with the existing social application client and may be convenient for iterations and update of the social application products.

In an embodiment, in order to solve the above problem, a method for removing alerts in the social application client may be further provided. The constructed device for removing the alerts in the social application client may be stored in the server, so that the device may run in the server to implement the removing of the alerts in the social application client.

The server may interact with a large amount of social application clients, to implement various functions of the social application clients.

Figure 8:
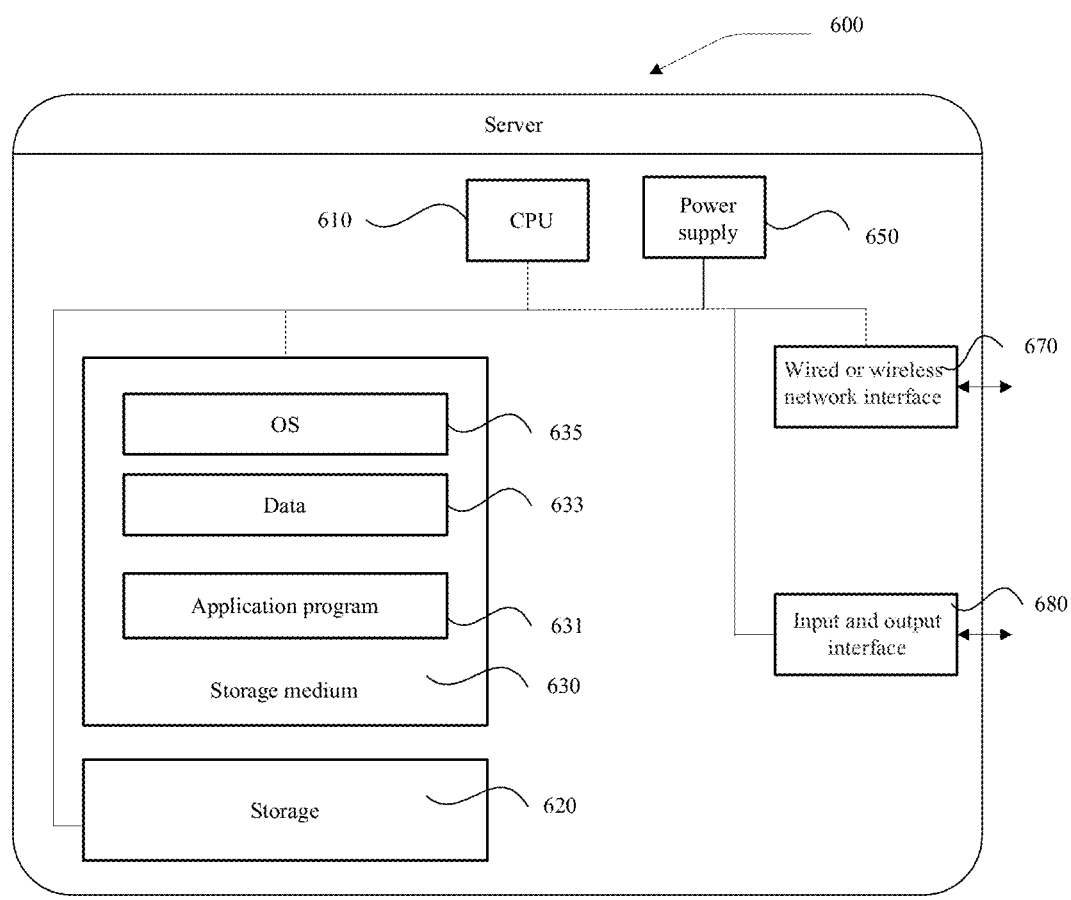
FIG. 8 is a diagram illustrating structure of a server in accordance with various embodiments of the preset disclosure.

FIG. 8 is a diagram illustrating structure of a server in accordance with various embodiments of the present disclosure. The server 600 may differ from each other a lot due to different configurations and performances, and may include one or more than one Central Processing Unit (CPU) 610 and storage 620, one or more than one storage medium 630, which may store an application program 631 and data 633.

The storage 620 and storage medium 630 may temporarily or permanently store information. The programs in the storage medium 630 may include one or more than one module (not shown in the Figure) and each module may include a serial of program instructions in the server 600.

Further, the CPU 610 may be configured to communicate with the storage medium 620 and execute a serial of program instructions in the storage medium 630 on the server 600. The server 600 may further include one or more than one power supply 650, one or more than one wired or wireless network interface 670, one or more than one input and output interface 680, and/or one or more than one Operating System (OS) 635, such as Windows Server™, Mac OS X™, Unix™, Linux™, FreeBSD™. The blocks in the following embodiments may be executed by the server 600.

It may be understood by a person skilled in the art of the present disclosure that all or partial of the above embodiments may be implemented via the hardware, or program instructions. The program instructions may be stored in a computer readable storage medium. The above storage medium may be Read-Only Memory (ROM), disk or Compact Disc (CD).

Figure 9:
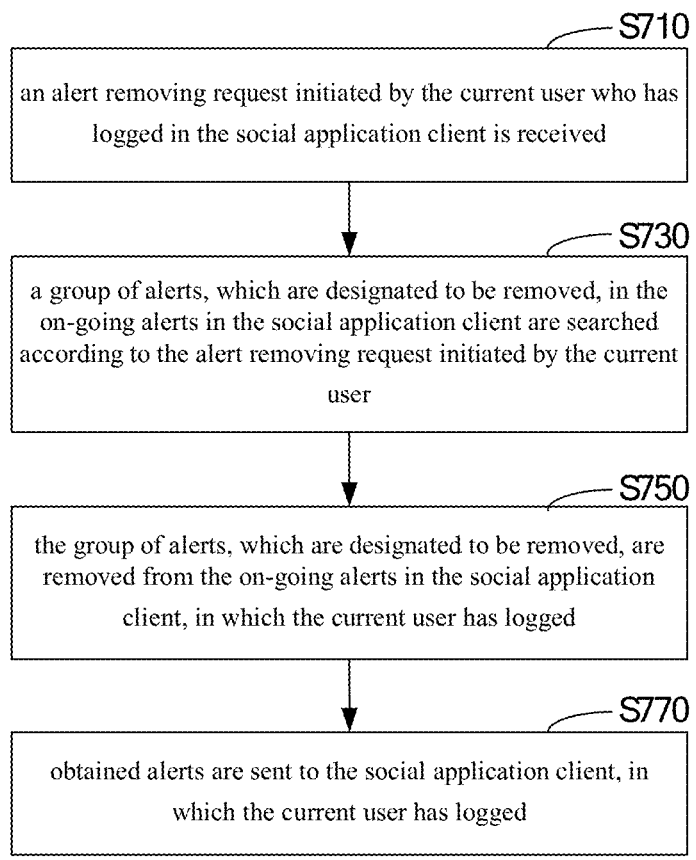
FIG. 9 is a flow chart illustrating a method for removing an alert in a social application client according to various embodiments of the present disclosure.

In one embodiment, the method for removing the alerts in the social application client may be shown in FIG. 9 and may include following blocks.

At block S710, an alert removing request initiated by the current user who has logged in the social application client may be received.

The server performing data interaction with the social application client may receive the alert removing request initiated by the current user of any social application client. The alert removing request may be initiated for removing the alerts in the social application client. Since the alerts currently displayed in the social application client may be obtained and displayed by the server, the removing of the alerts may be implemented by the server.

At block S730, a group of alerts, which may be designated to be removed, in the on-going alerts in the social application client may be searched according to the alert removing request initiated by the current user.

The server may store the on-going alerts in the social application client and alerts which may be directly designated by group, or the grading rule set for the current user in the social application client. As for the grading rule set for the current user in the server, the server may find the grading rule set for the current user, and obtain the alerts of the minimum level from the on-going alerts in the social application client according to the grading rule.

At block S750, the group of alerts, which may be designated to be removed, may be removed from the on-going alerts in the social application client, in which the current user may have logged.

On the one hand, according to the pre-designated alerts obtained via the above query, a group of alerts, which may be designated to be removed, may be found from the on-going alerts of the social application client, which may be stored in the server, and may be removed.

On the other hand, in the on-going alerts of the social application client stored in the server, the alerts of the minimum level may be removed to obtain the alerts of the higher level compared with the original alerts and to implement the screening of the alerts.

At block S770, obtained alerts may be sent to the social application client, in which the current user may have logged.

The server may send the alerts obtained after removing the alerts of the minimum level to the social application client, in which the current user may have logged, to clean the alerts in the social application client, and obtain messages, which may be sent from concerned contacts or groups, from the on-going alerts in the social application client. Therefore, effectiveness of the message delivery may be greatly improved and important messages may be found and extracted.

With the above process, the server may remove the alerts of the minimum level from the social application client, which may have initiated the alert removing request. When the alert removing request is triggered again, the removing of the alerts of the minimum level may be performed again. It should be noted that compared with the previous removing operation of the alerts of the minimum level, the level of the alerts removed by the currently-performed operation may be higher than the level of the alerts removed by the previous operation.

It should be noted that the server for implementing the above process may be a single server, or may include two types of servers, which may be set according to their functions, such as a transit server or a grading management server.

Specifically, the transit server may execute the above blocks S710, S730 and S770 and the grading management server may execute the above block S750. In the process of removing the on-going alerts in the social application client, the transit server may directly interact with the social application client and the grading management server may interact with the transit server to provide the transit server with the alerts of the minimum level in the on-going alerts in the social application client, in which the current user may have logged.

Figure 10:
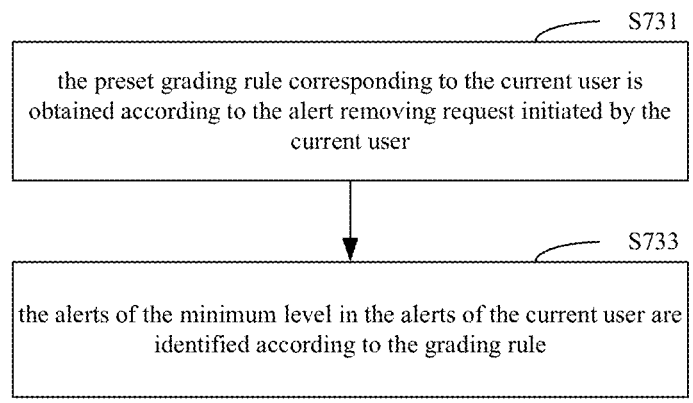
FIG. 10 is a flow chart illustrating a method for finding a group of alerts, which are designated to be removed, from all alerts in the social application client according to an alert removing request initiated by a current user in FIG. 9.

Further, in this embodiment, as shown in FIG. 10, the block S730 may include following blocks.

At block S731, the preset grading rule corresponding to the current user may be obtained according to the alert removing request initiated by the current user.

The server may store the grading rule corresponding to each user. The grading rule may be a default grading rule recommended for the user, or the grading rule obtained by adjusting the default grading rule recommended for the user.

Further, the grading management server may obtain the preset grading rule corresponding to the current user. That is, after the transit server receives the alert removing request initiated by the current user, the transit server may trigger the grading management server to obtain the preset grading rule corresponding to the current user.

At block S733, the alerts of the minimum level in the alerts of the current user may be identified according to the grading rule.

The grading management server may obtain the alert level corresponding to each alert from the alerts of the current user according to the obtained grading rule and obtain the alerts of the minimum level according to the obtained alert levels.

Figure 11:
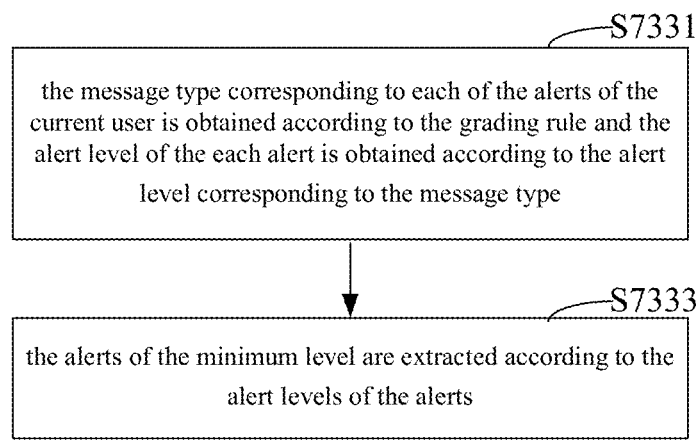
FIG. 11 is a flow chart illustrating a method for identifying alerts of the lowest level from all alerts of the current user according to a grading rule in FIG. 10.

Specifically, referring to FIG. 11, the block S733 may include following blocks.

At block S7331, the message type corresponding to each of the alerts of the current user may be obtained according to the grading rule and the alert level of the each alert may be obtained according to the alert level corresponding to the message type.

The grading rule stored in the grading management server may include several priority groups. Each priority group may define description of a message type. Alerts matching the description may belong to the same priority group and message type and may correspond to the same alert level. Therefore, the grading management server may determine the message type corresponding to each of the alerts of the current user according to the grading rule.

At block S7333, the alerts of the minimum level may be extracted according to the alert levels of the alerts.

After the grading management server extracts the alerts of the minimum level, the grading management server may return the extracted alerts of the minimum level to the transit server.

Figure 12:
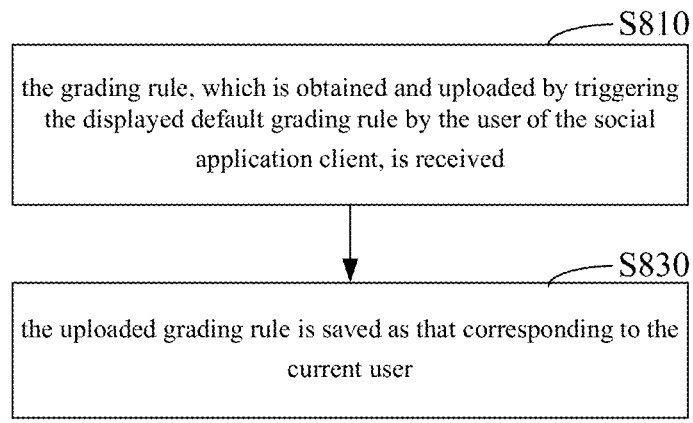
FIG. 12 is a flow chart illustrating a method for removing an alert in a social application client according to various embodiments of the present disclosure.

In an embodiment, as shown in FIG. 12, the above method may further include following blocks.

At block S810, the grading rule, which may be obtained and uploaded by triggering the displayed default grading rule by the user of the social application client, may be received.

At block S830, the uploaded grading rule may be saved as that corresponding to the current user.

At this block, the block S810 and the block S830 may be the processes for making minor changes to the default rule to obtain the final grading rule and may be implemented by the grading management server.

That is, in this process, the social application client may directly interact with the grading management server to set and manage the grading rule in the grading management server.

Figure 13:
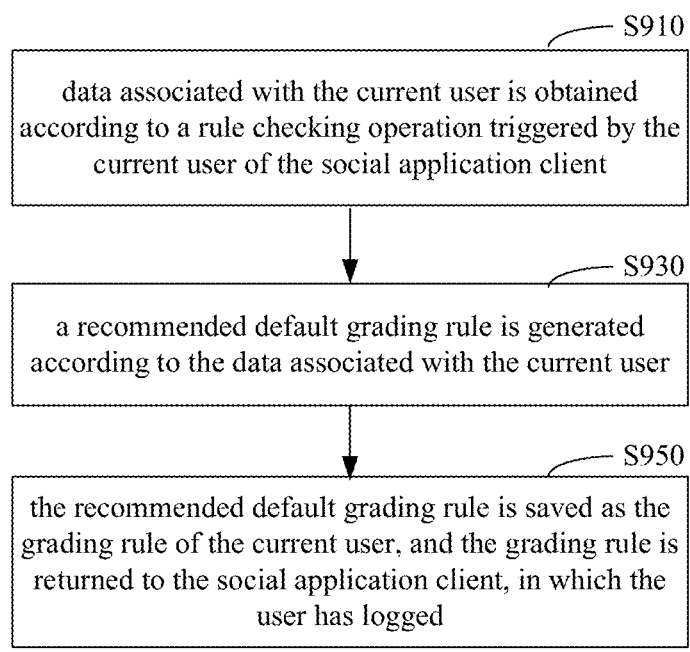
FIG. 13 is a flow chart illustrating a method for obtaining and uploading a grading rule according to a rule setting operation generated by triggering a displayed default grade rule in a social application client by the user in FIG. 12.

In another embodiment, as shown in FIG. 13, before the above block S810, the above method may further include following blocks.

At block S910, data associated with the current user may be obtained according to a rule checking operation triggered by the current user of the social application client.

At block S930, a recommended default grading rule may be generated according to the data associated with the current user.

At block S950, the recommended default grading rule may be saved as the grading rule corresponding to the current user, and the grading rule may be returned to the social application client, in which the user may have logged.

In this embodiment, the above process may be implemented via the interaction between the grading management server and the social application client.

With the above method for removing the alerts in the social application client, the social application client with the cooperation of the server, such as the transit server and the grading management server, may remove the alerts by levels. The alerts may be removed level by level according the triggered alert removing instructions and the large amount of alerts may be screened.

The above method for removing the alerts in the social application client may be described hereinafter in detail using a specific application scenario. During the specific implementation for removing the alerts in the social application client, two function modules may be set. As shown in FIG. 14, the function modules may include: a level setting module 1010 and a cleaning operation module 1030. The level setting module may be configured to set the grading rule for each user and determine the message level corresponding to each of the alerts of the user. The cleaning operation module 1030 may be configured to remove the alerts by levels according to the alert level corresponding to the each alert provided by the level setting module 1010.

Figure 15:
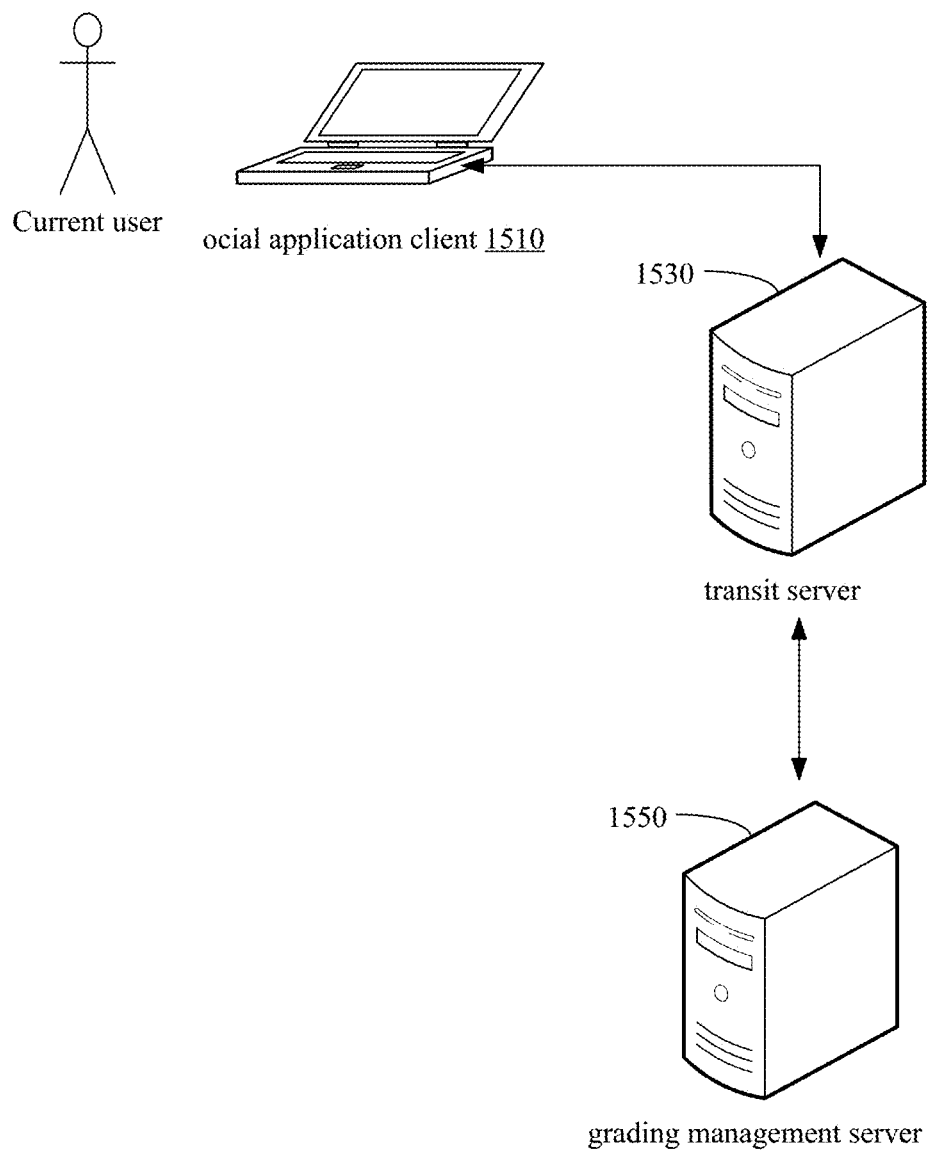
FIG. 15 is a diagram illustrating topology for removing an alert in a social application client according to various embodiments of the present disclosure.

Specifically, the level setting module 1010 may be set in the grading management server, while the cleaning operation module 1030 may be set in the transit server. For instance, the removing of the alerts in the social application client may be implemented via the topology shown in FIG. 15.

The social application client 1510, which may have triggered the removing operation, may have a lot of alerts. That is, each of multiple session objects may respectively send one or multiple messages. In the session list of the social application client 1510, the item corresponding to the each session object may display corresponding alerts.

Figure 16:
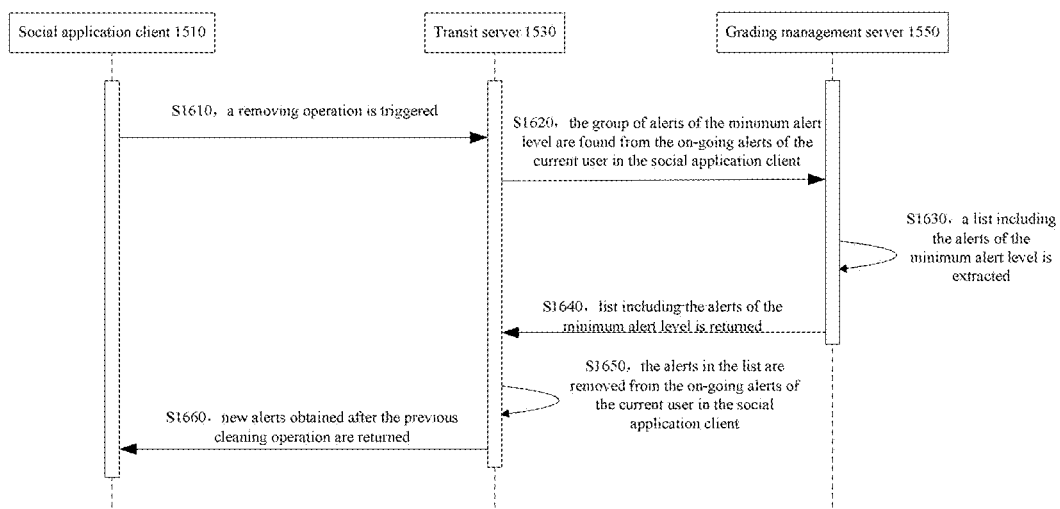
FIG. 16 is a diagram illustrating timing of response to a triggered removing operation in a social application client in FIG. 15.

In this scenario, the alerts of the minimum level displayed on the session list of the social application client 1510 may be removed by triggering the removing operation on the session list. The detail sequence of the execution process may be shown in FIG. 16. FIG. 16 may show the whole sequence process for the social application 1510 to obtain the session list after the alerts of the minimum level are removed and the whole sequence process may include the interaction between the social application client 1510 and the transit server 1530 after the removing operation is triggered, and the interaction between the transit server 1530 and the grading management server 1550.

The process in FIG. 16 may include following steps:

At step S1610, a removing operation is triggered by the social application client 1510.

At step S1620, the transit server 1530 may search the grading management server 1550 and find the group of alerts of the minimum alert level from the on-going alerts of the current user in the social application client.

At step 1630, the grading management server 1550 may generate a list including the alerts of the minimum alert level.

At step 1640, the grading management server 1550 may return the list including the alerts of the minimum alert level to the transit server 1530.

At step 1650, the transit server 1530 may remove the alerts in the list from the on-going alerts of the current user in the social application client.

At step 1660, the transmit server 1530 may return new alerts obtained by removing the alerts in the list from the on-going alerts to the social application client 1510.

In this embodiment, the new alerts returned by the transmit server 1530 may be a information, such as contacts and number of new messages sent from the contacts to the social application client 1510. The social application client 1510 may display the alerts according to the information, such as display red dot and number in circle on icons of the contacts.

In embodiments of the present disclosure, the alert displayed on a corresponding contact item or group item in the session list may be a red dot and number displayed on the contact item or group item in the session list. The contact item and group item may be displayed in the form of icons in the session list, such as a session list of IM application. The red dot may represent that there is at least one new message from the contact and the message has not been read. The number, such as a number in a circle, may represent the number of the new and unread messages from the contact. Before the alert removing operation, the social application client may display icons of contacts and display red dot and number on each icon of the contact, which has sent new messages to the social applicant client. After the social application client triggers the removing operation, the social application client may send a removing request carrying information of alerts, which are designated to be removed, to the server. For instance, the social application client may display alerts from three contacts, such as display red dots and number on icons of three contacts in the session list, such as contact A, contact B and contact C. The social application client may designate to remove alerts of the contact A, and the removing request may carry the information of the contact A. After receiving the removing request, the server may remove alerts of the contact A, such as information indicating alerting new messages from the contact A from the list including the on-going alerts and send the modified list, which includes alerts of the contact B and contact C to the social application client. In an embodiment, if the social application client does not designate removing alerts of which contacts, the server may find the alerts of the minimum level in the list including the on-going alerts according to the preset grading rule, such as find the alerts of the contact A. After receiving the modified list from the server, the social application client may update the session list according to the alerts in the modified list, such as display alerts of contact B and contact C, such as display the red dot and number on the icon of the contact B and contact C. After the above removing operation, the social application client on longer display alerts of the contact A.

Figure 17:
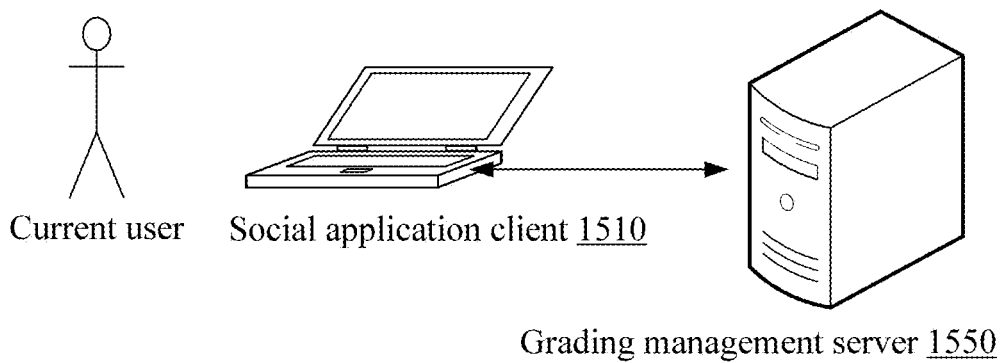
FIG. 17 is a diagram illustrating topology for setting grading rules according to various embodiments of the present disclosure.
Figure 18:
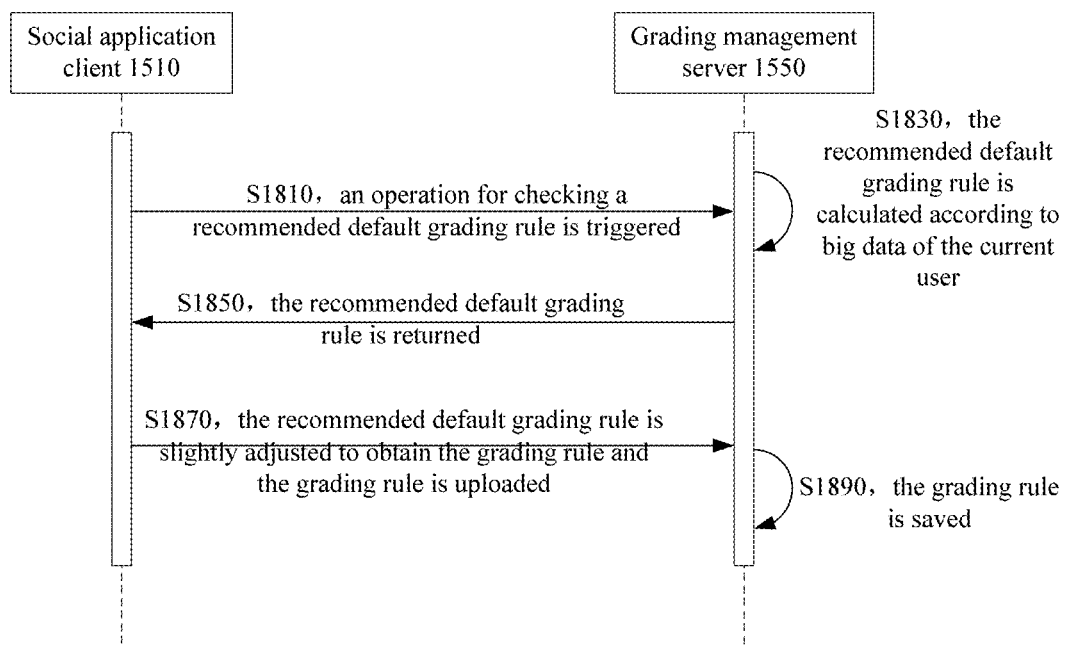
FIG. 18 is a diagram illustrating timing of setting grading rules in FIG. 17.

In the social application client 1510, each time the removing operation is executed, the sequence process shown in FIG. 16 may be executed and a session list, in which the alerts of an alert level have been removed, may be obtained. When the removing of the alerts may be needed again, the removing operation may be performed again, and so on, without more detailed description. Accordingly, the corresponding grading rule may need to be preset, so that the grading management server 1550 may obtain the alerts of the minimum level. Referring to FIG. 17, the grading rule may be set with the interaction of the social application client 1510 and grading management server 1550. The detail sequence process of the specific execution may be shown in FIG. 18. FIG. 18 may show the process for the grading management server 1550 to obtain the corresponding grading rule with the interaction between the social application client 1510 and the grading management server 1550, so that the grading management server 1550 may have the capability of determining the alert levels corresponding to the alerts of the current user of the social application client 1510.

The process in FIG. 18 may include following steps:

At step S1810, the social application client 1510 may initiate an operation for checking a recommended default grading rule.

At step S1830, the grading management server 1550 may calculate the recommended default grading rule according to big data of the current user.

At step S1850, the grading management server 1550 may return the recommended default grading rule to the social application client 1510.

At step S1870, the social application client 1510 may adjust the recommended default grading rule to obtain the grading rule and upload the grading rule.

At step 1890, the grading management server 1550 may store the grading rule.

Figure 19:
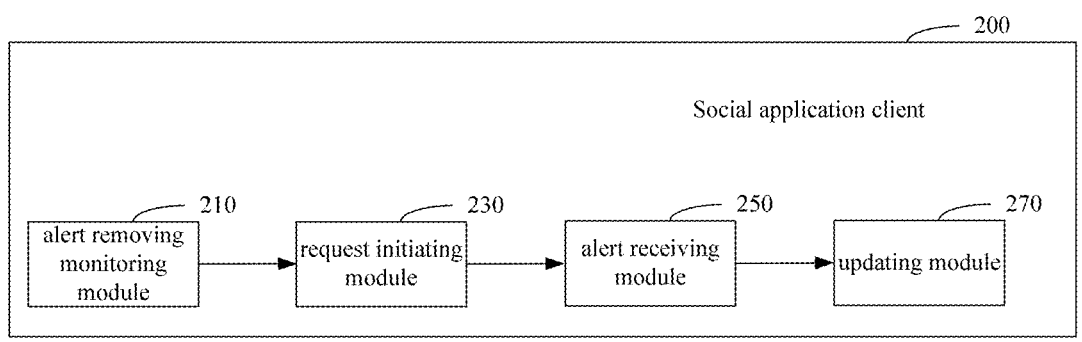
FIG. 19 is a diagram illustrating a system for removing an alert in a social application client according to various embodiments of the present disclosure.

In an embodiment, a system for removing alerts in a social application client may be provided. As shown in FIG. 19, the system may include a social application client 200. The social application client 200 may include: an alert removing monitoring module 210, a request initiating module 230, an alert receiving module 250 and an updating module 270.

The alert removing monitoring module 210 may be configured to monitor an alert removing instruction triggered by a current user for alerts in a social application client.

The request initiating module 230 may be configured to initiate an alerting removing request of the current user to a server according to the alert removing instruction.

The alert receiving module 250 may be configured to receive alerts triggered and returned by the server according to the alert removing request of the current user, wherein the alerts returned by the server are obtained by removing a group of alerts, which are designated to be removed, from on-going alerts in the social application client.

The updating module 270 may be configured to update the alerts in the social application client as the alerts returned by the server.

Figure 20:
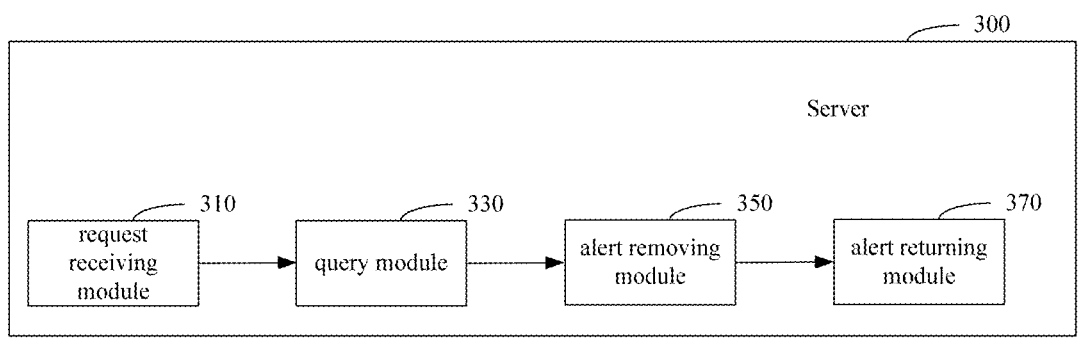
FIG. 20 is a diagram illustrating structure of a system for removing an alert in a social application client according to various embodiments of the present disclosure.

In an embodiment of the present disclosure, as shown in FIG. 20, the above system may further include: a server 300. The server 300 may include: a request receiving module 310, a query module 330, an alert removing module 350 and an alert returning module 370.

The request receiving module 310 may be configured to receive the alert removing request initiated by the social application client.

Figure 21:
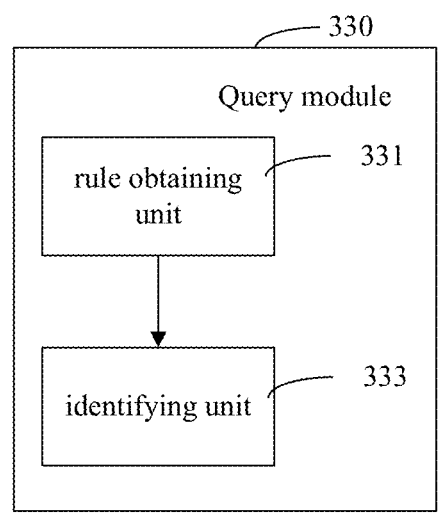
FIG. 21 is a diagram illustrating structure of a query module in FIG. 20.

The query module 330 may be configured to find the group of alerts, which are designated to be removed, from on-going alerts in the social application client according to the alert removing request of the current user;

Specifically, the group of alerts, which may be designated to be removed, may include alerts of the minimum level. As shown in FIG. 21, the query module 330 may include: a rule obtaining unit 331 and an identifying unit 333.

The rule obtaining unit 331 may be configured to obtain a grading rule preset for the current user according to the alert removing request initiated by the current user.

The identifying unit 333 may be configured to recognize the alerts of the minimum alert level from the alerts of the current user according to the grading rule.

Figure 22:
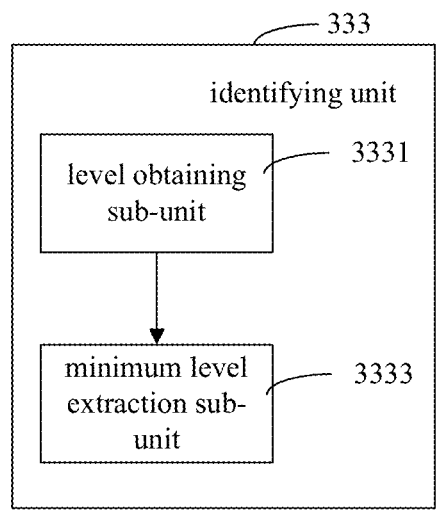
FIG. 22 is a diagram illustrating structure of an identifying unit in FIG. 21.

Specifically, as shown in FIG. 22, the identifying unit 333 may include a level obtaining sub-unit 3331 and a minimum level extraction sub-unit 3333.

The level obtaining sub-unit may be configured to obtain a message type corresponding to each of the alerts of the current user according to the grading rule, and obtain the alert level of the alert according to the alert level corresponding to the alert type.

The minimum level extraction sub-unit 3333 may be configured to obtain the alerts of the minimum level from the alerts of the current user according to an order of alert levels.

The alert removing module 350 may be configured to remove the group of the alerts, which are designated to be removed, from the alerts of the social application client.

The alert returning module 370 may be configured to return the alerts obtained by removing the alerts, which are designated to be removed, to the social application client, in which the user has logged.

Figure 23:
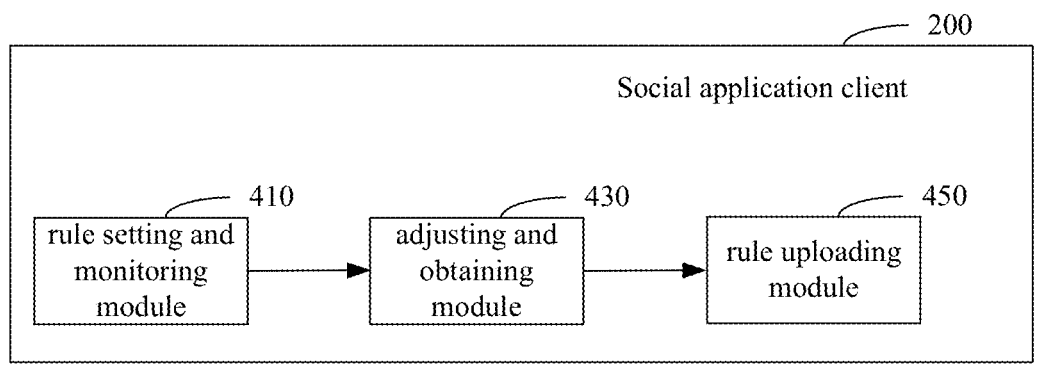
FIG. 23 is a diagram illustrating structure of a social application client according to various embodiments of the present disclosure.

In another embodiment, as shown in FIG. 23, the above social application client 200 may further include: a rule setting and monitoring module 410, an adjusting and obtaining module 430 and a rule uploading module 450.

The rule setting and monitoring module 410 may be configured to monitor a rule setting operation generated by triggering a default grading rule, which is displayed on the social application client, by the current user.

The adjusting and obtaining module 430 may be configured to obtain the grading rule of the current user by adjusting the default grading rule according to the rule setting operation.

The rule uploading module may be configured to upload the grading rule corresponding to the current user.

Figure 24:
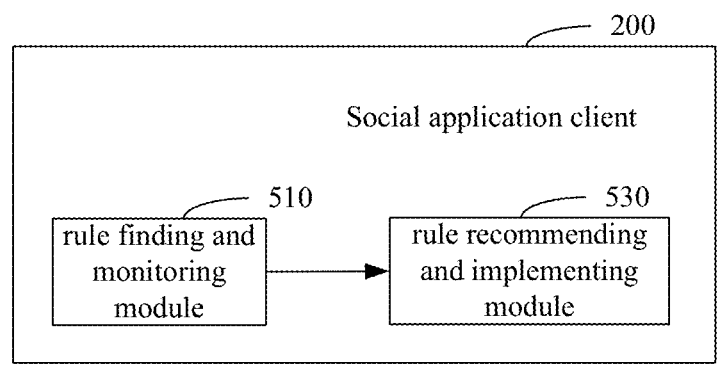
FIG. 24 is a diagram illustrating structure of a social application client according to various embodiments of the present disclosure.

Further, in an embodiment of the present disclosure, as shown in FIG. 24, the above social application client 200 may further include: a rule finding and monitoring module 510 and a rule recommending and implementing module 530.

The rule finding and monitoring module 510 may be configured to monitor a rule checking operation triggered by the current user in the social application client.

The rule recommending and implementing module 530 may be configured to obtain the default grading rule, which is recommended by the server according to data related to the current user, according to the rule checking operation and display the default grading rule in the social application client.

Figure 25:
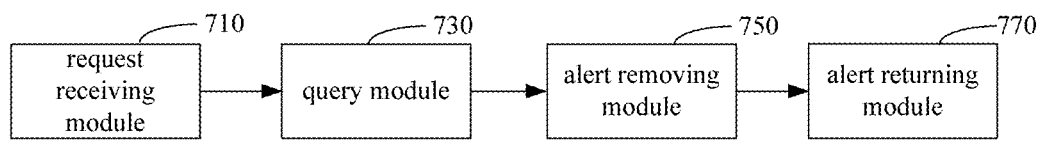
FIG. 25 is a diagram illustrating structure of a device for removing an alert in a social application client according to various embodiments of the present disclosure.

An embodiment of the present disclosure may provide a device for removing alerts in a social application client. As shown in FIG. 25, the device may include: a request receiving module 710, a query module 730, an alert removing module 750 and an alert returning module 770.

The request receiving module 710 may be configured to receive an alert removing request initiated by a current user, who has logged into a social application client.

The query module 730 may be configured to find a group of alerts, which are designated to be removed, from on-going alerts in the social application client according to the alert removing request initiated by the current user.

The alert removing module 750 may be configured to remove the group of alerts, which are designated to be removed, from the on-going alerts in the social application client, in which the current user has logged.

The alert returning module 770 may be configured to return alerts obtained after removing the group of alerts, which are designated to be removed, to the social application client, in which the current user has logged.

Figure 26:
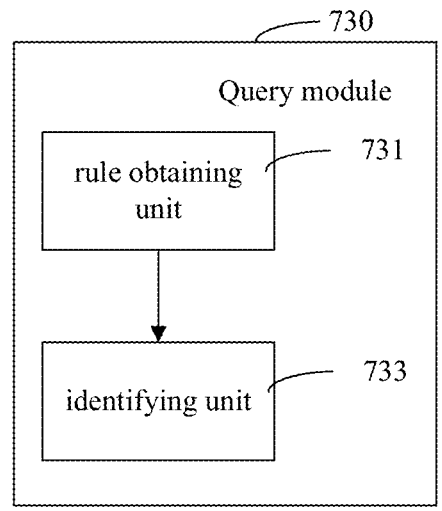
FIG. 26 is a diagram illustrating a query module in FIG. 25.

Further, in an embodiment, as shown in FIG. 26, the group of alerts, which are designated to be removed, are alerts of the minimum level. The query module 730 may include a rule obtaining unit 731 and an identifying unit 733.

The rule obtaining unit 731 may be configured to obtain a grading rule preset for the current user according to the alert removing request initiated by the current user.

The identifying unit 733 may be configured to recognize the alerts of the minimum alert level in the alerts of the current user according to the grading rule.

Figure 27:
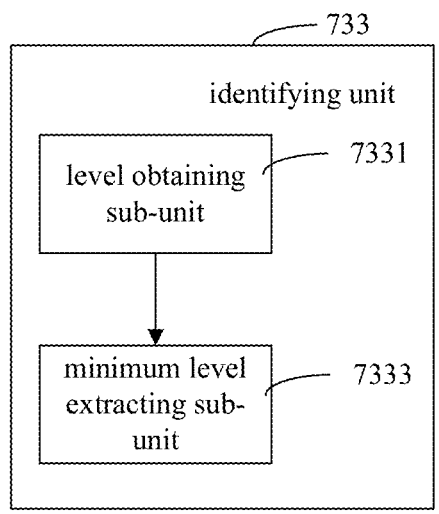
FIG. 27 is a diagram illustrating structure of an identifying unit in FIG. 26.

Specifically, referring to FIG. 27, the identifying unit 733 may include: a level obtaining sub-unit 7331 and a minimum level extracting sub-unit 7333.

The level obtaining sub-unit 7331 may be configured to obtain a message type corresponding to each of the alerts of the current user according to the grading rule, and obtain the alert level of the each alert according to the alert level corresponding to the alert type.

The minimum level extracting sub-unit 7333 may be configured to obtain the alerts of the minimum level according to the alert levels of the alerts.

Figure 28:
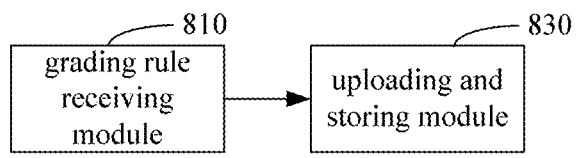
FIG. 28 is a diagram illustrating structure of a device for removing an alert in a social application client according to various embodiments of the present disclosure.

In an embodiment, as shown in FIG. 28, the above device may further include: a grading rule receiving module 810 and an uploading and storing module 830.

The grading rule receiving module 810 may be configured to receive the grading rule obtained and uploaded by a rule setting operation generated by triggering a default grading rule, which is displayed on the social application client, by the current user.

The uploading and storing module 830 may be configured to store the uploaded grading rule as the grading rule corresponding to the current user.

Figure 29:
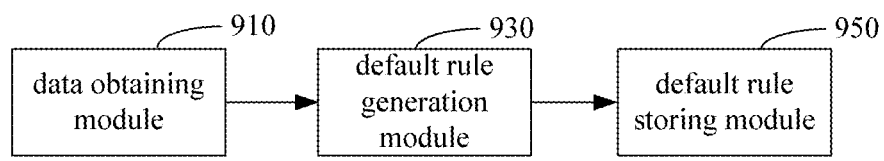
FIG. 29 is a diagram illustrating structure of a device for removing an alert in a social application client according to various embodiments of the present disclosure.

In an embodiment, as shown in FIG. 29, the above device may further include: a data obtaining module 910, a default rule generation module 930 and a default rule storing module 950.

The data obtaining module 910 may be configured to obtain data related to the current user according to a rule checking operation triggered by the current user who has logged in the social application client.

The default rule generation module 930 may be configured to generate the recommended default grading rule according to the data related to the current user.

The default rule storing module 950 may be configured to store the recommended default grading rule as the grading rule of the current user, and send the recommended default grading rule to the social application client, in which the current user has logged.

Figure 30:
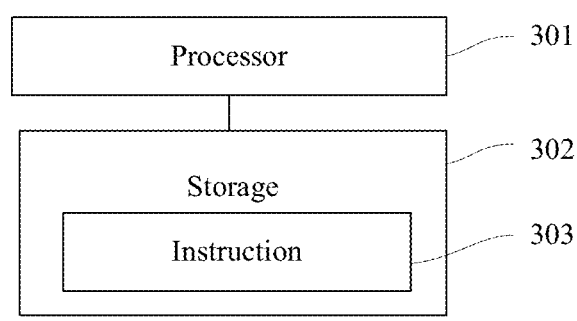
FIG. 30 is a diagram illustrating structure of a terminal device according to various embodiments of the present disclosure.

FIG. 30 is a diagram illustrating structure of a terminal device in accordance with various embodiments of the present disclosure. As shown in FIG. 30, the terminal device may include: one or more processors 301, a storage 302, and instructions, which may be stored in the storage 302 and executed by the one or multiple processors 301. The instructions may be executed to perform following operations:

monitoring an alert removing instruction triggered by a current user for alerts in a social application client;

initiating an alert removing request of the current user to a server according to the alert removing instruction;

receiving alerts triggered and returned by the server according to the alert removing request of the current user, wherein the alerts returned by the server are obtained by removing a group of alerts, which are designated to be removed, from on-going alerts in the social application client;

updating the alerts in the social application client as the alerts returned by the server.

In an embodiment, the instructions may be executed to perform following operations:

monitoring a rule setting operation generated by triggering a default grading rule, which is displayed on the social application client, by the current user;

obtaining the grading rule of the current user by adjusting the default grading rule according to the rule setting operation;

uploading the grading rule corresponding to the current user.

In an embodiment, the instructions may be executed to perform following operations:

monitoring a rule checking operation triggered by the current user in the social application client;

obtaining the default grading rule, which is recommended by the server according to data related to the current user, according to the rule checking operation and displaying the default grading rule in the social application client.

An embodiment of the present disclosure may provide a server, including:

a storage;

one or more processors;

wherein the storage stores instructions, which are executed by the one or multiple processors, the instructions are executed to perform following operations:

receiving an alert removing request initiated by a current user, who has logged into a social application client;

finding a group of alerts, which are designated to be removed, from on-going alerts in the social application client according to the alert removing request initiated by the current user;

removing the group of alerts, which are designated to be removed, from the on-going alerts in the social application client, in which the current user has logged; and returning alerts obtained after removing the group of alerts, which are designated to be removed, to the social application client, in which the current user has logged.

In an embodiment of the present disclosure, the group of alerts, which are designated to be removed, are alerts of the minimum level, and the instructions may be further executed to perform following operations:

obtaining a grading rule preset for the current user according to the alert removing request initiated by the current user;

recognizing the alerts of the minimum alert level in the alerts of the current user according to the grading rule.

In an embodiment of the present disclosure, the instructions may be further executed to perform following operations:

obtaining a message type corresponding to each of the alerts of the current user according to the grading rule, and obtaining the alert level of the each alert according to the alert level corresponding to the alert type;

obtaining the alerts of the minimum level according to the alert levels of the alerts.

In an embodiment of the present disclosure, the instructions may be executed to perform following operations:

receiving the grading rule obtained and uploaded by an rule setting operation generated by triggering a default grading rule, which is displayed on the social application client, by the current user;

storing the uploaded grading rule as the grading rule corresponding to the current user.

In an embodiment of the present disclosure, the instructions may be further executed to perform following operations:

obtaining data related to the current user according to a rule checking operation triggered by the current user who has logged in the social application client;

generating the recommended default grading rule according to the data related to the current user;

storing the recommended default grading rule as the grading rule of the current user; and sending the recommended default grading rule to the social application client, in which the current user has logged.

It can be obtained from the above technical scheme that when alerts are made for new messages received by the social application client, the alerts may be made for the new messages of one contact or for the new messages of multiple contacts. When the social application client monitors the alert removing instruction triggered for a monitored alert from a session interface of the social application client, the social application client may initiate the alert removing request of the current user to the server. Then, the social application client may receive the alerts triggered and returned from the server according to the alert removing request of the current user. The alerts returned from the server may be obtained by removing a group of alerts, which may be designated to be removed, from the on-going alerts in the social application client. The social application client may update the alerts to those obtained by removing the group of alerts, which may be designated to be removed. It can be obtained that several alert levels may be set for the messages in the social application, a group of alerts, which may be designated to be removed, in the social application client may be removed according to an alert removing instruction. All of the alerts may not need to be clicked one by one to remove them. The missing of the concerned new message caused by the one-key-to-remove function may be avoided. Therefore, new concerned messages in the social application client may be rapidly identified.

The embodiments of the disclosed technology have been described above. However, these embodiments are for illustrative purposes only, but are not intended to limit the scope of the disclosed technology. Although the respective embodiments have been described above separately, it does not mean that the measures in the various embodiments cannot be advantageously used in combination. The scope of the disclosed technology is defined by the appended claims and their equivalents. Various alternatives and modifications may be made by the skilled in the art without departing from the scope of the disclosed technology, and such alternatives and modifications should fall into the scope of the disclosed technology.

What is claimed is:

1. A method for removing alerts, applied to a server, which comprises: a storage, one or more processors, wherein the method comprises:
   receiving a grading rule obtained and uploaded by a rule setting operation generated by triggering a default grading rule, which is displayed on a social application client;
   storing the uploaded grading rule as a grading rule of a user who has logged into the social application client;
   receiving an alert removing request initiated by the user who has logged into the social application client to remove alerts based on alert levels, the alert removing request being triggered by a preset single touch gesture operation;
   obtaining the grading rule of the user according to the alert removing request initiated by the user;
   finding a first group of alerts having a minimum alert level from the alerts in the social application client according to the grading rule in response to the alert removing request, wherein each of the alerts corresponds to a message type and each message type corresponds to an alert level;
   removing the first group of alerts having the minimum alert level from the alerts in the social application client;
   receiving the alert removing request initiated by the user again as a subsequent alert removing request, the subsequent alert removing request being triggered by the same preset single touch gesture operation;
   in response to the subsequent alert removing request, finding, according to the same grading rule, a second group of alerts having a minimum alert level from the alerts after the first group of alerts are removed, wherein the alert level of the second group of alerts is higher than the alert level of the first group of alerts according to the grading rule;
   removing the second group of alerts; and
   returning alerts obtained after removing the first and second groups of alerts to the social application client.

2. The method according to claim 1, wherein recognizing the alerts of the minimum alert level from the alerts of the user according to the grading rule comprises:
   obtaining the message type corresponding to each of the alerts of the user according to the grading rule, and obtaining an alert level of the each alert according to the alert level corresponding to the message type; and
   obtaining the alerts of the minimum alert level according to the alert levels of the alerts.

3. The method according to claim 1, further comprising:
   obtaining data related to the user according to a rule checking operation triggered by the user;
   generating the recommended default grading rule according to the data related to the user;
   storing the recommended default grading rule as the grading rule of the user; and
   sending the recommended default grading rule to the social application client.

4. The method according to claim 1, wherein the preset touch gesture operation is a sliding operation or a long press operation.

5. A server comprising:
   a storage;
   one or more processors;
   wherein the storage stores instructions that, when executed by the one or more processors, cause the processors to perform operations comprising:
   receiving a grading rule obtained and uploaded by a rule setting operation generated by triggering a default grading rule, which is displayed on a social application client;
   storing the uploaded grading rule as a grading rule of a user who has logged into the social application client;
   receiving an alert removing request initiated by the user who has logged into the social application client to remove alerts based on alert levels, the alert removing request being triggered by a preset single touch gesture operation;
   obtaining the grading rule of the user according to the alert removing request initiated by the user;
   finding a first group of alerts having a minimum alert level from the alerts in the social application client according to the grading rule in response to the alert removing request, wherein each of the alerts corresponds to a message type and each message type corresponds to an alert level;
   removing the first group of alerts having the minimum alert level from the alerts in the social application client;
   receiving the alert removing request initiated by the user again as a subsequent alert removing request, the subsequent alert removing request being triggered by the same preset single touch gesture operation;
   in response to the subsequent alert removing request, finding, according to the same grading rule, a second group of alerts having a minimum alert level from the alerts after the first group of alerts are removed, wherein the alert level of the second group of alerts is higher than the alert level of the first group of alerts according to the grading rule;

removing the second group of alerts; and
returning alerts obtained after removing the first and second groups of alerts to the social application client.

6. The server according to claim 5, wherein the operations further comprise:
obtaining the message type corresponding to each of the alerts of the user according to the grading rule, and obtaining an alert level of the each alert according to the alert level corresponding to the message type; and
obtaining the alerts of the minimum alert level according to the alert levels of the alerts.

7. The server according to claim 5, wherein the operations further comprise:
obtaining data related to the user according to a rule checking operation triggered by the user;
generating the recommended default grading rule according to the data related to the user;
storing the recommended default grading rule as the grading rule of the user; and
sending the recommended default grading rule to the social application client.

8. A method for removing alerts, applied to a social application client, the method being implemented by a storage and one or more processors, wherein the method comprises:
receiving a grading rule obtained by a rule setting operation generated by triggering a default grading rule, which is displayed on the social application client;
uploading the grading rule to a server to be stored as a grading rule of a user who has logged into the social application client;
displaying alerts for messages on a session interface;
monitoring an alert removing instruction triggered by the user for the alerts in the social application client, the alert removing request being triggered by a preset single touch gesture operation;
initiating an alert removing request of the user to the server according to the alert removing instruction;
receiving first alerts returned by the server according to the alert removing request of the user, wherein the alerts returned by the server are obtained by removing a first group of alerts having a minimum alert level from alerts for the messages on the session interface in the social application client, the first group of alerts being identified according to the grading rule of the user, wherein each of the alerts corresponds to a message type and each message type corresponds to an alert level;
receiving the alert removing instruction triggered by the user again and sending a subsequent alert removing request to the server, the subsequent alert removing request being triggered by the same preset single touch gesture operation;
receiving second alerts returned by the server according to the subsequent alert removing request after the server removes a second group of alerts having a minimum alert level from the alerts after the first group of alerts are removed, the second group of alerts being identified according to the same grading rule of the user, wherein the alert level of the second group of alerts is higher than the alert level of the first group of alerts according to the grading rule; and
updating the alerts for the messages in the social application client as the second alerts returned by the server.

9. The method according to claim 8, wherein monitoring the alert removing instruction triggered by the user for the alerts in the social application client comprises:
monitoring a session list displayed on an interface of the social application client to determine whether a preset operation is executed.

10. The method according to claim 8, wherein updating the alerts for the messages in the social application client as the second alerts returned by the server comprises:
updating alerts for the messages in a session list of the social application client to the second alerts returned by the server.

11. The method according to claim 8, wherein the messages are received by the social application client and are unread.

12. The method according to claim 10, further comprising:
displaying, in the session list, icons of contacts and a number on each icon of the contacts, the number indicating a number of alerts associated with the contact;
wherein the group of alerts having the minimum alert level include alerts associated with a first contact, and after updating the alerts for the messages in the social application client as the alerts returned by the server, the number of the icon of the first contact is no longer displayed.

* * * * *